(12) United States Patent
Hoult (10) Patent No.: US 9,062,737 B2
(45) Date of Patent: Jun. 23, 2015

(54) SHOCK ABSORBER WITH FOUR CHAMBERS

(75) Inventor: Will Hoult, Woking (GB)

(73) Assignee: McLaren Automotive Limited, Woking, Surrey (GB)

( * ) Notice: Subject to any disclaimer, the term of this patent is extended or adjusted under 35 U.S.C. 154(b) by 88 days.

(21) Appl. No.: 13/487,334

(22) Filed: Jun. 4, 2012

(65) Prior Publication Data

US 2013/0319804 A1    Dec. 5, 2013

(51) Int. Cl.
*F16F 9/16* (2006.01)
*F16F 9/26* (2006.01)

(52) U.S. Cl.
CPC ........................................ *F16F 9/26* (2013.01)

(58) Field of Classification Search
CPC ............... F16F 9/16; F16F 9/165; F16F 9/18; F16F 9/185
USPC ......................................... 188/297, 312, 313
See application file for complete search history.

(56) References Cited

U.S. PATENT DOCUMENTS

| | | |
|---|---|---|
| 3,273,876 A | 9/1966 | Hannan |
| 3,559,776 A | 2/1971 | Schultze |
| 4,054,277 A | 10/1977 | Sirven |
| 4,662,486 A | 5/1987 | Stenberg |
| 4,736,931 A | 4/1988 | Christopherson |
| 4,887,515 A | 12/1989 | Tabata |
| 4,923,038 A | 5/1990 | Lizell |
| 5,024,460 A | 6/1991 | Hanson et al. |
| 5,148,896 A | 9/1992 | Ralph |
| 5,163,538 A | 11/1992 | Derr et al. |
| 5,163,706 A | 11/1992 | Maguran, Jr. et al. |
| 5,195,619 A | 3/1993 | Dourson et al. |
| 5,219,152 A | 6/1993 | Derrien et al. |
| 5,282,645 A | 2/1994 | Spakowski et al. |
| 5,472,070 A | 12/1995 | Feigel |
| 5,477,949 A | 12/1995 | Forster et al. |
| 5,586,627 A | 12/1996 | Nezu et al. |
| 5,588,510 A | 12/1996 | Wilke |
| 5,730,261 A | 3/1998 | Spakowski et al. |
| 5,901,820 A | 5/1999 | Kashiwagi et al. |
| 5,924,528 A | 7/1999 | Vermolen et al. |

(Continued)

FOREIGN PATENT DOCUMENTS

| | | |
|---|---|---|
| DE | 4029490 C2 * | 6/1992 |
| EP | 0 461 981 A2 | 6/1991 |

(Continued)

OTHER PUBLICATIONS

Search Report and Written Opinion dated Jun. 15, 2010 in corresponding PCT Application No. PCT/US2010/022054.

(Continued)

*Primary Examiner* — Anna Momper
(74) *Attorney, Agent, or Firm* — Harness, Dickey & Pierce, P.L.C.

(57) ABSTRACT

A shock absorber has a first pressure tube and a second pressure tube. A first piston is disposed within the first pressure tube and a second piston is disposed within the second pressure tube. Movement of the first and second pistons within their respective pressure tubes control both damping characteristics for the shock absorber and stiffness for the shock absorber. Valving in the pistons and/or external valving associated with each pressure tube generates both the damping characteristics and the stiffness.

6 Claims, 5 Drawing Sheets

(56) References Cited

U.S. PATENT DOCUMENTS

| | | | |
|---|---|---|---|
| 6,155,391 | A | 12/2000 | Kashiwagi et al. |
| 6,283,259 | B1 | 9/2001 | Nakadate |
| 6,321,888 | B1 | 11/2001 | Reybrouck et al. |
| 6,427,986 | B1 | 8/2002 | Sakai et al. |
| 6,464,048 | B1 | 10/2002 | Groves et al. |
| 6,527,093 | B2 | 3/2003 | Oliver et al. |
| 6,837,343 | B1 * | 1/2005 | Bugaj ............... 188/304 |
| 6,851,529 | B2 * | 2/2005 | Jones et al. ............ 188/378 |
| 6,938,887 | B2 * | 9/2005 | Achenbach ............ 267/64.22 |
| 2005/0056504 | A1 | 3/2005 | Holiviers |
| 2005/0121268 | A1 | 6/2005 | Groves et al. |
| 2005/0173214 | A1 | 8/2005 | Lemmens et al. |
| 2006/0108190 | A1 | 5/2006 | Forster |
| 2007/0000743 | A1 | 1/2007 | Naitou et al. |
| 2007/0017760 | A1 | 1/2007 | Runkel |
| 2007/0084687 | A1 | 4/2007 | Foster et al. |
| 2009/0084643 | A1 | 4/2009 | Bugaj |
| 2009/0200760 | A1 | 8/2009 | Gartner et al. |
| 2011/0147148 | A1 | 6/2011 | Ripa |

FOREIGN PATENT DOCUMENTS

| | | |
|---|---|---|
| JP | 02-236035 | 9/1990 |
| JP | 2007-506055 | 3/2007 |
| KR | 10-2000-0055863 | 9/2000 |
| WO | 2011/039498 A1 | 4/2011 |

OTHER PUBLICATIONS

Search Report and Written Opinion dated Jan. 23, 2009 in corresponding PCT Application No. PCT/US2008/008740.

Search Report and Written Opinion dated Aug. 12, 2013 in corresponding PCT Application No. PCT/US2013/039625.

European Search Report dated May 26, 2014 in corresponding EP Application No. 14156486.

Office Action dated Oct. 24, 2014 in corresponding U.S. Appl. No. 14/010,236.

* cited by examiner

SHOCK ABSORBER WITH FOUR CHAMBERS

FIELD

The present disclosure relates generally to hydraulic dampers or shock absorbers for use in a suspension system such as a suspension system used for automotive vehicles. More particularly, the present disclosure relates to a hydraulic damper or shock absorber which includes four working chambers.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to one of the sprung portion and the unsprung portion of the vehicle. The piston is connected to the other of the sprung portion and unsprung portion of the automobile through a piston rod which extends through the pressure tube. The piston divides the pressure tube into an upper working chamber and a lower working chamber both of which are filled with hydraulic fluid. Because the piston is able, through valving, to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. For a mono-tube shock absorber, the valving on the piston limits the flow of damping fluid between the upper and lower working chambers when the shock absorber is extended or compressed to produce a damping load. During driving, the suspension system moves in jounce (compression) and rebound (extension). During jounce movements, the shock absorber is compressed causing damping fluid to move through the base valve in a dual-tube shock absorber or through the piston valve in a mono-tube shock absorber. A damping valve located on the base valve or the piston controls the flow of damping fluid and thus the damping force created. During rebound movements, the shock absorber is extended causing damping fluid to move through the piston in both the dual-tube shock absorber and the mono-tube shock absorber. A damping valve located on the piston controls the flow of damping fluid and thus the damping force created.

In a dual-tube shock absorber, the piston and the base valve normally include a plurality of compression passages and a plurality of extension passages. During jounce movements in a dual-tube shock absorber, the damping valve or the base valve opens the compression passages in the base valve to control fluid flow and produce a damping load. A check valve on the piston opens the compression passages in the piston to replace damping fluid in the upper working chamber but this check valve may or may not contribute to the damping load. The damping valve on the piston closes the extension passages of the piston and a check valve on the base valve closes the extension passages of the base valve during a compression movement. During rebound movements in a dual-tube shock absorber, the damping valve on the piston opens the extension passages in the piston to control fluid flow and produce a damping load. A check valve on the base valve opens the extension passages in the base valve to replace damping fluid in the lower working chamber but this check valve may or may not contribute to the damping load.

In a mono-tube shock absorber, the piston normally includes a plurality of compression passages and a plurality of extension passages. The shock absorber will also include means for compensating for the rod volume flow of fluid as is well known in the art. During jounce movements in a mono-tube shock absorber, the compression damping valve on the piston opens the compression passages in the piston to control fluid flow and produce a damping load. The extension damping valve on the piston closes the extension passages of the piston during a jounce movement. During rebound movements in a mono-tube shock absorber, the extension damping valve on the piston opens the extension passages in the piston to control fluid flow and produce a damping load. The compression damping valve on the piston closes the compression passages of the piston during a rebound movement.

SUMMARY

This section provides a general summary of the disclosure, and is not a comprehensive disclosure of its full scope or all of its features.

The present disclosure relates to a hydraulic damper or shock absorber which includes four working chambers. A conventional hydraulic or shock absorber typically includes an upper working chamber and a lower working chamber defined by a pressure tube which are separated by a piston assembly. Movement of the piston assembly in the pressure tube causes fluid to be transferred between the upper and lower working chambers. Valving located within the piston assembly and/or exterior to the pressure tube restricts flow of the fluid between the upper and lower working chambers to create damping characteristics for the hydraulic damper or shock absorber. The present disclosure includes a second pressure tube which defines a second upper working chamber and a second lower working chamber which are separated by a second piston assembly. Movement of the second piston assembly in the second pressure tube causes fluid to be transferred between the second upper and second lower working chambers. Valving located within the second piston assembly and/or exterior to the second pressure tube restricts flow of the fluid between the second upper and second lower working chambers to create damping characteristics for the hydraulic damper or shock absorber. The damping characteristics generated by fluid flow between the upper and lower working chambers can be tuned separately from the damping characteristics generated by fluid flow between the second upper and second lower working chambers.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
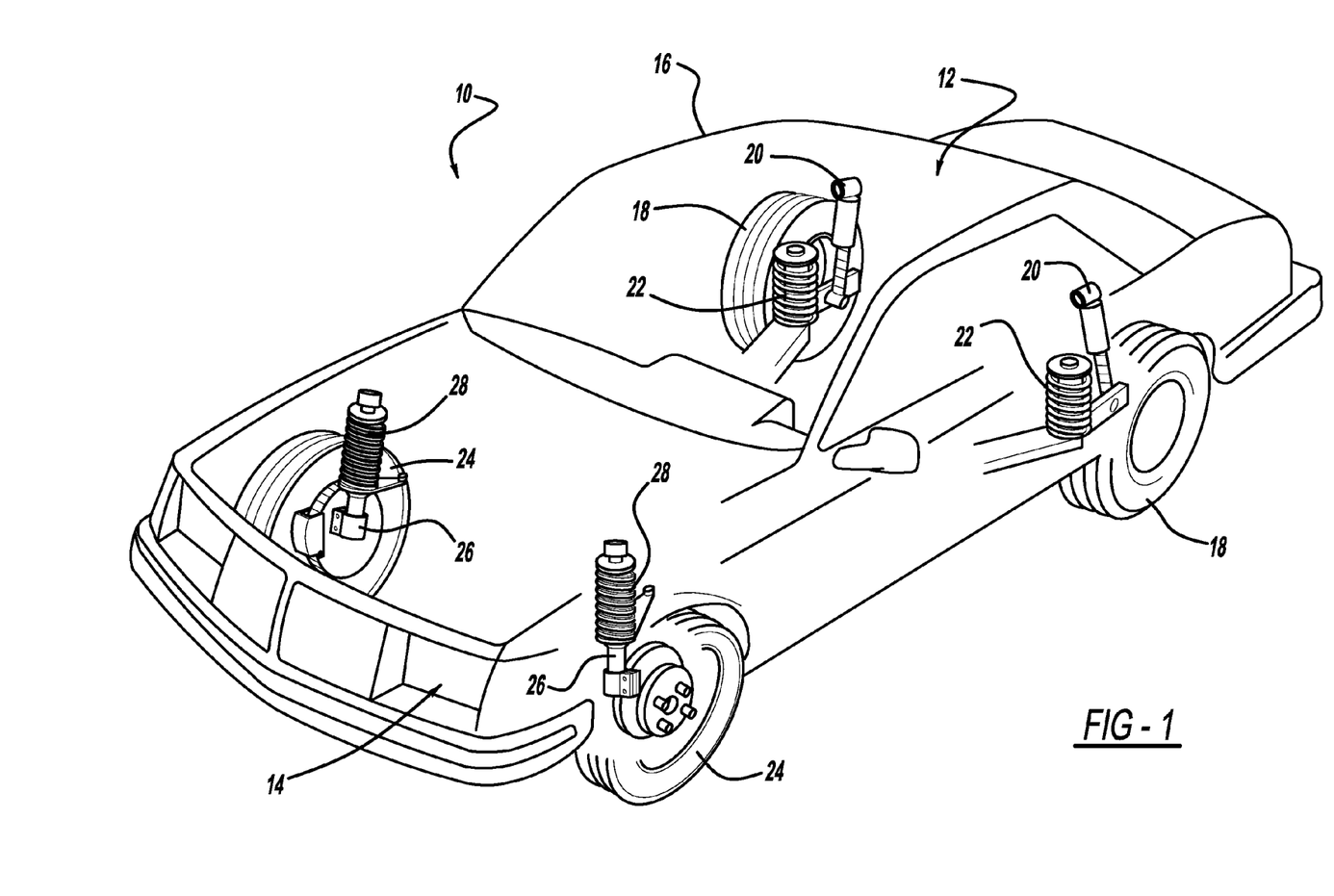
FIG. 1 illustrates an automotive vehicle which incorporates shock absorbers in accordance with the present disclosure.

The following description is merely exemplary in nature and is not intended to limit the present disclosure, application, or uses. Referring now to the drawings in which like reference numerals designate like components throughout the several views, there is shown in FIG. 1 a vehicle incorporating a suspension system having shock absorbers in accordance with the present disclosure, and which is designated by the reference numeral 10.

Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
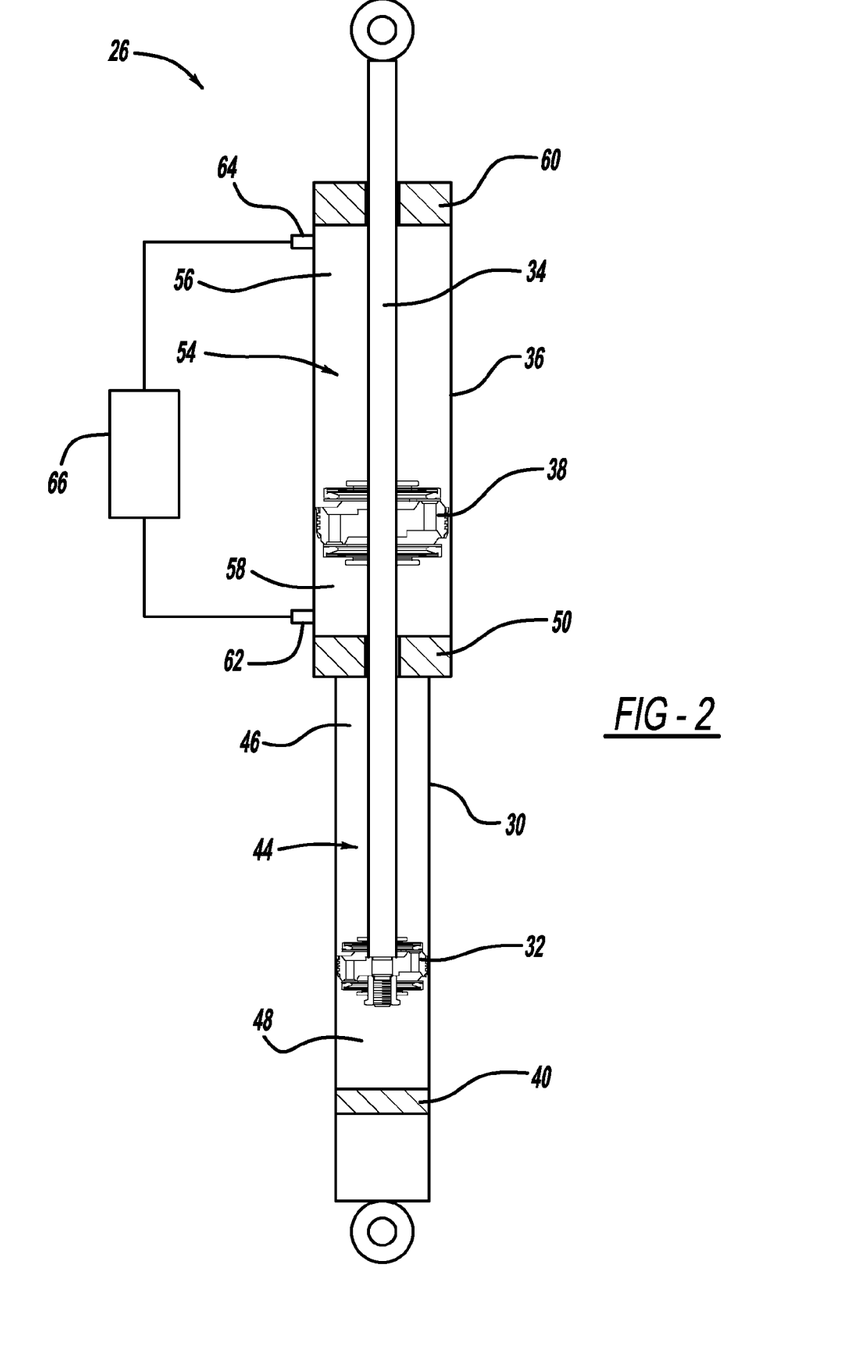
FIG. 2 is a cross-sectional side view of one of the shock absorbers illustrated in FIG. 1.

Referring now to FIG. 2, shock absorber 26 is shown in greater detail. While FIG. 2 illustrates only shock absorber 26, it is to be understood that shock absorber 20 also includes the dual pressure tube design described below for shock absorber 26. Shock absorber 20 only differs from shock absorber 26 in the manner in which it is adapted to be connected to the sprung and unsprung masses of vehicle 10. Shock absorber 26 comprises a first pressure tube 30, a first piston assembly 32, a piston rod 34, a second pressure tube 36, a second piston assembly 38 and a compensation piston 40.

First pressure tube 30 defines a first fluid chamber 44. First piston assembly 32 is slidably disposed within first pressure tube 30 and divides first fluid chamber 44 into a first upper working chamber 46 and a first lower working chamber 48. A seal is disposed between first piston assembly 32 and first pressure tube 30 to permit sliding movement of first piston assembly 32 with respect to first pressure tube 30 without generating undue frictional forces as well as sealing first upper working chamber 46 from first lower working chamber 48. Piston rod 34 is attached to first piston assembly 32 and extends through first upper working chamber 46 and through a first rod guide assembly 50 which closes one end of first pressure tube 30 and one end of second pressure tube 36. A sealing system seals the interface between first rod guide assembly 50 and piston rod 34. The end of piston rod 34 opposite to first piston assembly 32 is adapted to be secured to one of the sprung mass and unsprung mass of vehicle 10. Because piston rod 34 extends only through first upper working chamber 46 and not first lower working chamber 48, extension and compression movements of first piston assembly 32 with respect to first pressure tube 30 causes a difference in the amount of fluid displaced in first upper working chamber 46 and the amount of fluid displaced in first lower working chamber 48. The difference in the amount of fluid displaced is known as the "rod volume" and compensation for this difference of fluid flow causes movement of compensation piston 40 within first pressure tube 30 as is well known in the art. A compressed fluid is typically disposed between compensation piston 40 and the end of first pressure tube 30. The end of first pressure tube 30 opposite to first rod guide assembly 50 is adapted to be secured to the other of the sprung mass and the unsprung mass of vehicle 10.

Second pressure tube 36 defines a second fluid chamber 54. Second piston assembly 38 is slidably disposed within second pressure tube 36 and divides second fluid chamber 54 into a second upper working chamber 56 and a second lower working chamber 58. A seal is disposed between second piston assembly 38 and second pressure tube 36 to permit sliding movement of second piston assembly 38 with respect to second pressure tube 36 without generating undue frictional forces as well as sealing second upper working chamber 56 from second lower working chamber 58. Piston rod 34 is attached to second piston assembly 38 and extends through second upper working chamber 56, second lower working chamber 58 and through a second rod guide assembly 60 which closes the other end of second pressure tube 36. A sealing system seals the interface between second rod guide assembly 60 and piston rod 34.

A fluid port 62 is in communication with second lower working chamber 58 and a fluid port 64 is in communication with second upper working chamber 56. A hydraulic system 66, which may include at least one accumulator, is in communication with fluid port 62 and fluid port 64. Damping characteristics are determined by first piston assembly 32 and can also be determined by second piston assembly 38. Stiffness for shock absorber 26 is determined by hydraulic system 66.

Figure 3:
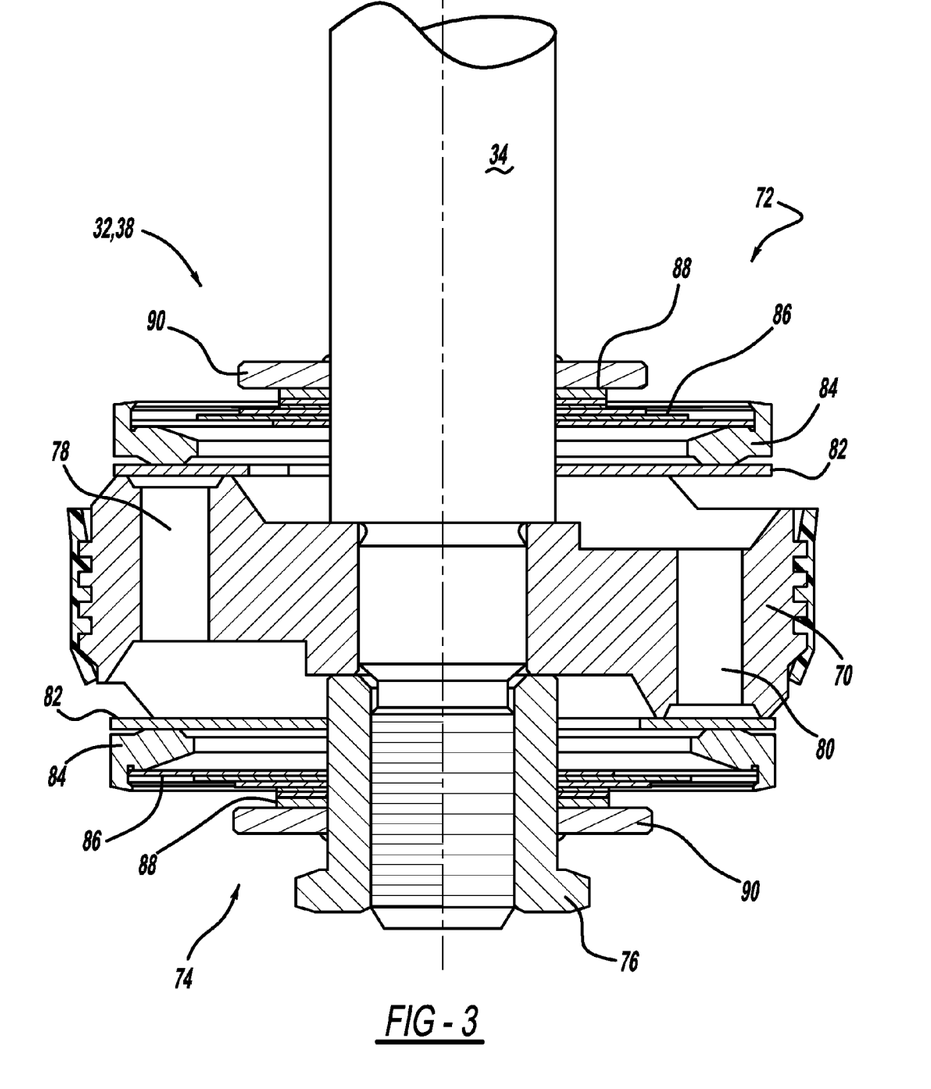
FIG. 3 is an enlarged cross-sectional side view of one of the piston assemblies from the shock absorber illustrated in FIG. 2.

Referring to FIG. 3, each piston assembly 32, 38 comprises a piston 70, a compression valve assembly 72 and an extension valve assembly 74. A nut 76 is assembled to piston rod 34 to secure compression valve assembly 72, piston 70 and extension valve assembly 74 of first piston assembly 32 to piston rod 34. Compression valve assembly 72, piston 70 and extension valve assembly 74 of second piston assembly 38 are secured to piston rod 34 using nuts, welding or other methods known in the art. Each piston 70 defines a plurality of compression passages 78 and a plurality of extension passages 80.

Each compression valve assembly 72 comprises one or more valve discs 82, an interface disc 84, one or more preload discs 86, one or more spacer discs 88 and a retainer 90. Retainer 90 is attached to piston rod 34 by threading engagement, welding, engagement with a shoulder on piston rod 34 or by any other method known in the art. The one or more spacer discs 88 directly abut retainer 90. Each extension valve assembly 74 comprises the one or more valve discs 82, the interface disc 84, the one or more preload discs 86, the one or more spacer discs 88 and a retainer 90. In extension valve assembly 74 associated with first piston assembly 32, nut 76 operates as retainer 90. Retainer 90 is attached to piston rod 34 by threading engagement, welding, engagement with a shoulder on piston rod 34 or by any other method known in the art for second piston assembly 38. The one or more spacer discs 88 directly abut retainer 90. The one or more preload discs 86 directly abut the one or more spacer discs 88. The interface disc 84 directly abuts the one or more preload discs 86. The one or more valve discs 82 directly abut both interface disc 84 and piston 70. The one or more preload discs 86 generate a biasing load due to deflection of the one or more preload discs 86 to bias the one or more valve discs 82 into engagement with piston 70 by reacting through interface disc 84.

During a compression stroke, fluid in first and second lower working chambers 48 and 58 are pressurized causing fluid pressure to react against each compression valve assembly 72 associated with first piston assembly 32 and second piston assembly 38. Fluid pressure will react against each of the one or more valve discs 82 of each compression valve assembly 72 until the generated load exceeds the preload of each of the one or more preload discs 86. When the generated load exceeds the preload, each of the one or more valve discs 82 will totally separate from each piston 70 to open both of the plurality of compression passages 78 by bending each of the one or more preload discs 86.

During a rebound stroke, fluid in upper working chambers 46 and 56 are pressurized causing fluid pressure to react against each extension valve assembly 74 associated with first piston assembly 32 and second piston assembly 38. Fluid pressure will react against each of the one or more valve discs 82 of each extension valve assembly 74 until the generated load exceeds the preload of each of the one or more preload discs 86. When the generated load exceeds the preload, each of the one or more valve discs 82 will totally separate from each piston 70 to open each of the plurality of compression passages 78 by bending each of the one or more preload discs 86.

During both compression and rebound strokes, stiffness for shock absorber 26 is determined by hydraulic system 66 which receives fluid from upper working chamber 56 and from lower working chamber 58 and transfers fluid to upper working chamber 56 and to lower working chamber 58.

Shock absorber 26 can be utilized a suspension system where one set of upper and lower working chambers (the upper set in FIG. 2) is used to generate damping forces in rebound and compression and the other set of upper and lower working chambers (the lower set in FIG. 2) is used to generate stiffness in rebound and compression independently. Thus, shock absorber 26 can partially or completely replace the spring in a suspension system with a tuneable stiffness generated from the shock absorber.

Figure 4:
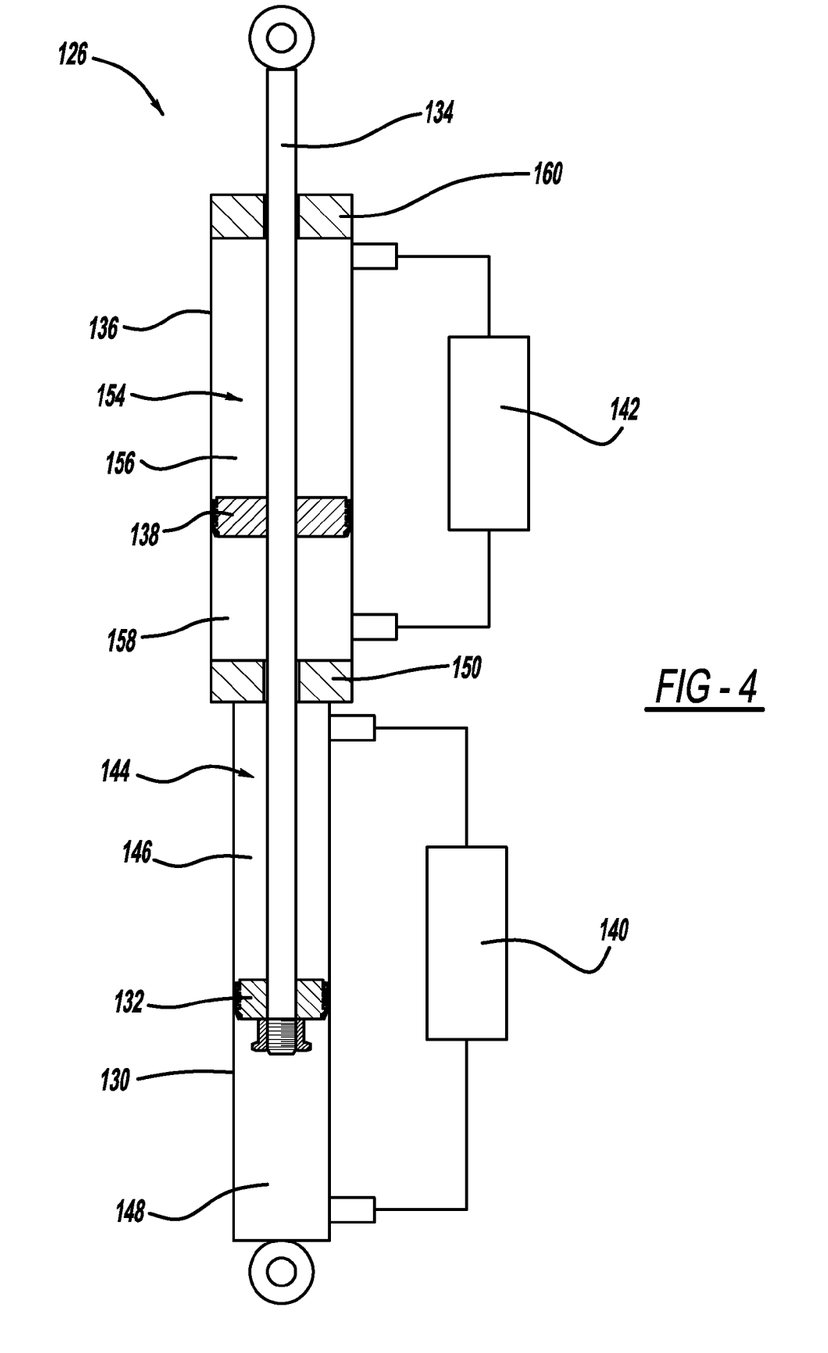
FIG. 4 is a cross-sectional side view of a shock absorber in accordance with another embodiment of the present disclosure.

Referring now to FIG. 4, a shock absorber 126 in accordance with another embodiment of the present disclosure is illustrated. Shock absorber 126 comprises a first pressure tube 130, a first piston 132, a piston rod 134, a second pressure tube 136, a second piston 138, a first external valving system 140 and a second external valving system 142.

First pressure tube 130 defines a first fluid chamber 144. First piston 132 is slidably disposed within first pressure tube 130 and divides first fluid chamber 144 into a first upper working chamber 146 and a first lower working chamber 148. A seal is disposed between first piston 132 and first pressure tube 130 to permit sliding movement of first piston 132 with respect to first pressure tube 130 without generating undue frictional forces as well as sealing first upper working chamber 146 from first lower working chamber 148. Piston rod 134 is attached to first piston 132 and extends through first upper working chamber 146 and through a first rod guide assembly 150 which closes one end of first pressure tube 130 and one end of second pressure tube 136. A sealing system seals the interface between first rod guide assembly 150 and piston rod 134. The end of piston rod 134 opposite to first piston 132 is adapted to be secured to one of the sprung mass and unsprung mass of vehicle 10. Because piston rod 134 extends only through first upper working chamber 146 and not first lower working chamber 148, extension and compression movements of first piston 132 with respect to first pressure tube 130 causes a difference in the amount of fluid displaced in first upper working chamber 146 and the amount of fluid displaced in first lower working chamber 148. The difference in the amount of fluid displaced is known as the "rod volume" and compensation for this difference of fluid flow is accommodated for by external valving system 140. The end of first pressure tube 130 opposite to first rod guide assembly is adapted to be secured to the other of the sprung mass and unsprung mass of vehicle 10.

Second pressure tube 136 defines a second fluid chamber 154. Second piston 138 is slidably disposed within second pressure tube 136 and divides second fluid chamber 154 into a second upper working chamber 156 and a second lower working chamber 158. A seal is disposed between second piston 138 and second pressure tube 136 to permit sliding movement of second piston 138 with respect to second pressure tube 136 without generating undue frictional forces as well as sealing second upper working chamber 156 from second lower working chamber 158. Piston rod 134 is attached to second piston 138 and extends through second upper working chamber 156, second lower working chamber 158 and through a second rod guide assembly 160 which closes the other end of second pressure tube 136. A sealing system seals the interface between second rod guide assembly 160 and piston rod 134.

During a compression stroke, fluid in first and second lower working chambers 148 and 158 are pressurized causing fluid to flow into first external valving system 140 and second external valving system 142. First and second external valving systems 140 and 142 include the necessary valving systems to generate the damping loads for shock absorber 26, the stiffness for shock absorber 26 as well as compensate for any rod volume of fluid generated.

During a rebound stroke, fluid in first and second upper working chambers 146 and 156 are pressurized causing fluid to flow into first external valving system 140 and second external valving system 142. First and second external valving systems 140 and 142 include the necessary valving systems, accumulators and other hydraulic components to generate the damping loads for shock absorber 26, the stiffness for shock absorber 26 as well as compensate for any rod volume of fluid generated.

Figure 5:
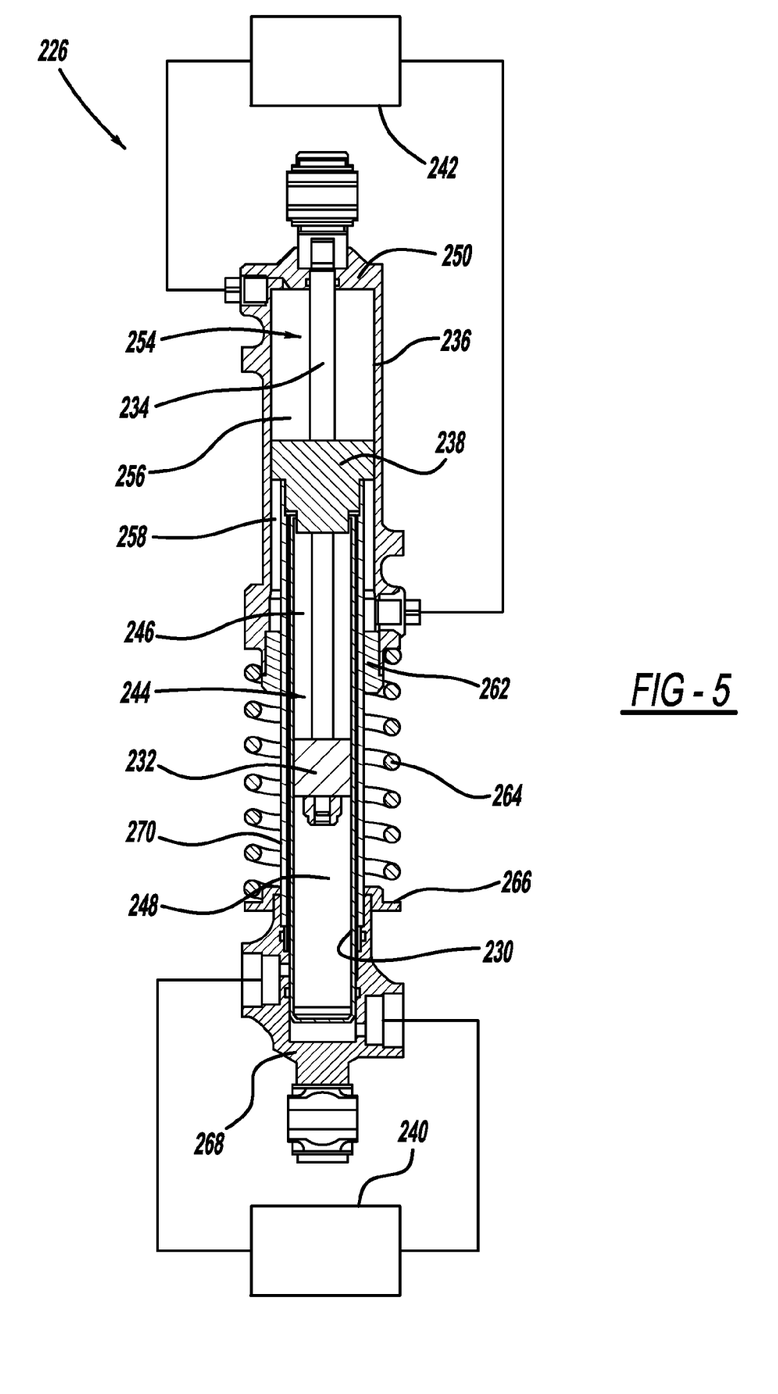
FIG. 5 is a cross-sectional side view of a shock absorber in accordance with another embodiment of the present disclosure.

Referring now to FIG. 5, a shock absorber 226 in accordance with another embodiment of the present disclosure is illustrated. Shock absorber 226 comprises a first pressure tube 230, a first piston 232, a piston rod 234, a second pressure tube 236, a second piston 238, a first external valving system 240 and a second external valving system 242.

First pressure tube 230 defines a first fluid chamber 244. First piston 232 is slidably disposed within first pressure tube 230 and divides first fluid chamber 244 into a first upper working chamber 246 and a first lower working chamber 248. A seal is disposed between first piston 232 and first pressure tube 230 to permit sliding movement of first piston 232 with respect to first pressure tube 230 without generating undue frictional forces as well as sealing first upper working chamber 246 from first lower working chamber 248. Piston rod 234 is attached to first piston 232 and extends through first upper working chamber 246 and through second piston 238 which closes one end of first pressure tube 230 and is attached to a first rod guide assembly 250 which closes one end of second pressure tube 236. A sealing system seals the interface between second piston 238 and piston rod 234. The end of piston rod 234 opposite to first piston 232 is adapted to be secured to one of the sprung mass and unsprung mass of vehicle 10. Because piston rod 234 extends only through first upper working chamber 246 and not first lower working chamber 248, extension and compression movements of first piston 232 with respect to first pressure tube 230 causes a difference in the amount of fluid displaced in first upper working chamber 246 and the amount of fluid displaced in first lower working chamber 248. The difference in the amount of fluid displaced is known as the "rod volume" and compensation for this difference of fluid flow is accommodated for by external valving system 240. The end of first pressure tube 230 opposite to second piston 238 is adapted to be secured to the other of the sprung mass and unsprung mass of vehicle 10.

Second pressure tube 236 defines a second fluid chamber 254. Second piston 238 is slidably disposed within second pressure tube 236 and divides second fluid chamber 254 into a second upper working chamber 256 and a second lower working chamber 258. A seal is disposed between second piston 238 and second pressure tube 236 to permit sliding movement of second piston 238 with respect to second pressure tube 236 without generating undue frictional forces as well as sealing second upper working chamber 256 from second lower working chamber 258. Piston rod 234 slidingly engages second piston 238 and extends through second upper working chamber 256, second lower working chamber 258 and is attached to rod guide assembly 250 which closes the one end of second pressure tube 236. A sealing system seals the interface between second rod guide assembly 250 and piston rod 234. The opposite end of second pressure tube 236 is closed by a sealing system 262 which seals the interface between second pressure tube 236 and first pressure tube 230. A coil spring 264 extends between second pressure tube 236 and a lower spring retainer 266 engaging an end cap 268 which closes the end of first pressure tube 230. An intermediate tube 270 defines an intermediate chamber that places first upper working chamber 246 in direct fluid communication with external valve system 240.

During a compression stroke, fluid in first lower working chambers 248 and second upper chamber 256 are pressurized causing fluid to flow into first external valving system 240 and second external valving system 242. First and second external valving systems 240 and 242 include the necessary valving systems, accumulators or other hydraulic components to generate the damping loads for shock absorber 26, the stiffness for shock absorber 26 as well as compensate for any rod volume of fluid generated.

During a rebound stroke, fluid in first upper working chambers 246 and second lower working chamber 258 are pressurized causing fluid to flow into first external valving system 240 and second external valving system 242. First and second external valving systems 240 and 242 include the necessary valving systems, accumulators or other hydraulic components to generate the damping loads for shock absorber 26, the stiffness for shock absorber 26 as well as compensate for any rod volume of fluid generated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber comprising:
a first pressure tube defining a first fluid chamber;
a first piston slidingly engaging said first pressure tube, said first piston dividing said first pressure tube into a first upper working chamber and a first lower working chamber, said first piston sealing said first upper working chamber from said first lower working chamber;
a second pressure tube defining a second fluid chamber separate from said first fluid chamber;
a second piston slidingly engaging said second pressure tube, said second piston dividing said second pressure tube into a second upper working chamber and a second lower working chamber, said second piston sealing said second upper working chamber from said second lower working chamber;
a piston rod fixably attached to said first piston and slidably attached to said second piston;
a first external valving system disposed between said first upper working chamber and said first lower working chamber;
a second external valving system disposed between said second upper working chamber and said second lower working chamber; and
the first pressure tube comprising an intermediate tube that defines an intermediate chamber that places the first upper working chamber in direct fluid communication with the first external valving system.

2. The shock absorber according to claim 1, further comprising a rod guide assembly closing an end of said second pressure tube, said second piston closing an end of said first pressure tube.

3. The shock absorber according to claim 1, wherein said piston rod is fixably attached to said rod guide assembly.

4. The shock absorber according to claim 1, further comprising a first hydraulic system disposed between said second upper working chamber and said second lower working chamber.

5. The shock absorber according to claim 4, further comprising a second hydraulic system disposed between said first upper working chamber and said first lower working chamber.

6. The shock absorber according to claim 1, further comprising a coil spring extending between said second pressure tube and a lower spring retainer engaging an end cap which closes the end of said first pressure tube.

* * * * *